(12) United States Patent
Bushman (10) Patent No.: US 9,740,569 B2
(45) Date of Patent: *Aug. 22, 2017

(54) HEAD START POPULATION OF AN IMAGE BACKUP

(71) Applicant: STORAGECRAFT TECHNOLOGY CORPORATION, Draper, UT (US)

(72) Inventor: Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/966,433

(22) Filed: Dec. 11, 2015

(65) Prior Publication Data

US 2016/0371150 A1    Dec. 22, 2016

Related U.S. Application Data

(63) Continuation of application No. 14/743,486, filed on Jun. 18, 2015, now Pat. No. 9,317,376.

(51) Int. Cl.
    *G06F 11/14* (2006.01)
    *G06F 3/06* (2006.01)
    *G06F 17/30* (2006.01)
    *H04L 12/911* (2013.01)

(52) U.S. Cl.
    CPC ......... *G06F 11/1451* (2013.01); *G06F 3/067* (2013.01); *G06F 3/0619* (2013.01); *G06F 3/0665* (2013.01); *G06F 11/1435* (2013.01); *G06F 11/1464* (2013.01); *G06F 11/1466* (2013.01); *G06F 17/3028* (2013.01); *G06F 17/30088* (2013.01); *G06F 17/30117* (2013.01); *H04L 47/70* (2013.01); *G06F 2201/80* (2013.01); *G06F 2201/84* (2013.01)

(58) Field of Classification Search
    CPC ............ G06F 11/1451; G06F 11/1466; G06F 11/1458
    See application file for complete search history.

(56) References Cited

U.S. PATENT DOCUMENTS

| 7,797,483 | B1 | 9/2010 | Suryanarayanan |
| 2014/0164330 | A1 | 6/2014 | Barnes |
| 2015/0052320 | A1 | 2/2015 | Peretz |

OTHER PUBLICATIONS

Office Action mailed Nov. 10, 2015 in U.S. Appl. No. 14/743,486.
Notice of Allowance mailed Dec. 14, 2015 in U.S. Appl. No. 14/743,486.

*Primary Examiner* — Reginald Bragdon
*Assistant Examiner* — Edward Wang
(74) *Attorney, Agent, or Firm* — Maschoff Brennan (57) ABSTRACT

Head start population of an image backup. In one example embodiment, a method for head start population of an image backup may include tracking blocks that are modified in a source storage between a first point in time and a second point in time, head start copying a first portion of the modified blocks into the image backup prior to the second point in time and ceasing the tracking of the first portion of the modified blocks as being modified, activating a snapshot on the source storage at the second point in time where the snapshot represents a state of the source storage at the second point in time, and copying, subsequent to the second point in time, from the snapshot and into the image backup, a second portion of the modified blocks that were not yet copied into the image backup by the second point in time.

17 Claims, 4 Drawing Sheets

HEAD START POPULATION OF AN IMAGE BACKUP

CROSS-REFERENCE TO A RELATED APPLICATION

This application is a continuation of U.S. patent application Ser. No. 14/743,486, filed Jun. 18, 2015, and titled "HEAD START POPULATION OF AN IMAGE BACKUP," which is incorporated herein by reference in its entirety.

FIELD

The embodiments disclosed herein relate to head start population of an image backup.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

In general, the population of an image backup of a source storage begins at the particular point in time represented by the image backup and is completed after all the targeted blocks from the source storage have been copied to the image backup. One common problem encountered during the population of the image backup is the drain on system resources that the population of the image backup entails. Further, since the image backup is not generally available for a restoration until after the population of the image backup has been completed, the image backup may be unavailable for an unacceptable length of time where the population of the image backup is not completed prior to the need for a restoration of the image backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate head start population of an image backup. In particular, the example methods disclosed herein may get a head start on the population of an image backup prior to the particular point in time represented by the image backup, thereby leaving fewer modified blocks from the source storage to be copied to the image backup after the particular point in time. This head start population may be performed during periods of relatively low resource utilization prior to the point in time, which may enable the head start population to lessen the overall drain on system resources during the population of the image backup. Further, since this head start population of a portion of the blocks prior to the particular point in time leaves fewer blocks to be copied subsequent to the particular point in time, the length of time between the particular point in time and the completion of the population of the image backup may be reduced, thereby increasing the likelihood that the image backup will be available for a restoration prior to the need for the restoration.

In one example embodiment, a method for head start population of an image backup may include tracking blocks that are modified in a source storage between a first point in time and a second point in time, head start copying a first portion of the modified blocks into the image backup prior to the second point in time and ceasing the tracking of the first portion of the modified blocks as being modified, activating a snapshot on the source storage at the second point in time where the snapshot represents a state of the source storage at the second point in time, and copying, subsequent to the second point in time, from the snapshot and into the image backup, a second portion of the modified blocks that were not yet copied into the image backup by the second point in time.

In another example embodiment, a method for head start population of an image backup may include tracking, in a modify map, blocks that are modified in a source storage between a first point in time and a second point in time, head start copying a first portion of the modified blocks into an image backup and removing the tracking of the first portion of the modified blocks in the modify map prior to the second point in time, activating a snapshot on the source storage at the second point in time where the snapshot represents a state of the source storage at the second point in time, and copying, subsequent to the second point in time, from the snapshot and into the image backup, a second portion of the modified blocks that were tracked in the modify map at the second point in time.

In yet another example embodiment, a method for head start population of an image backup may include tracking, in a modify map, blocks that are modified in a source storage between a first point in time and a second point in time, tracking, in a copy map, all of the modified blocks that are copied into an image backup between the first point in time and the second point in time, head start copying a first portion of the modified blocks into the image backup and removing the tracking of the first portion of the modified blocks in the copy map prior to the second point in time, activating a snapshot on the source storage at the second point in time where the snapshot represents a state of the source storage at the second point in time, and copying, subsequent to the second point in time, from the snapshot and into the image backup, a second portion of the modified blocks that were tracked in the modify map at the second point in time but were not yet tracked in the copy map by the second point in time.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media capable of storing data in blocks, such as one or more floppy disks, optical disks, magnetic disks, or solid state (flash) disks, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full backup" as used herein refers to a full backup of a storage that includes at least a copy of each unique allocated block of the storage at a point in time such that the full backup can be restored on its own to recreate the state of the storage at the point in time, without being dependent on any other backup. A "full backup" may also include nonunique allocated blocks and free blocks of the storage at the point in time. An example file format for a "full backup" is the ShadowProtect Full (SPF) image backup format. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial full backup of the storage, can be restored together as an incremental image backup chain to recreate the state of the storage at the subsequent point in time. An "incremental backup" may also include nonunique allocated blocks and free blocks of the storage that were modified between the previous point in time and the subsequent point in time. An example file format for an "incremental backup" is the ShadowProtect Incremental (SPI) image backup format. The term "modified block" as used herein refers to a block that was modified either because the block was previously allocated and changed or because the block was modified by writing to a newly allocated block. The term "decremental backup" as used herein refers to an at least partial backup of a storage that includes at least a copy of each unique allocated block from a full backup of the storage that corresponds to a block that was modified in the source storage between a previous point in time and a subsequent point in time, such that the decremental backup, along with all subsequent decremental backups of the storage, including a full backup of the storage, can be restored together as a decremental image backup chain to recreate the state of the storage at the previous point in time. A "decremental backup" may also include nonunique allocated blocks and free blocks from a full backup of the storage that correspond to blocks that were modified in the source storage between the point in time and the subsequent point in time. It is understood that a "full backup," an "incremental backup," and/or a "decremental backup" may exclude certain undesired allocated blocks such as blocks belonging to files whose contents are not necessary for restoration purposes, such as virtual memory pagination files and machine hibernation state files.

Figure 1:
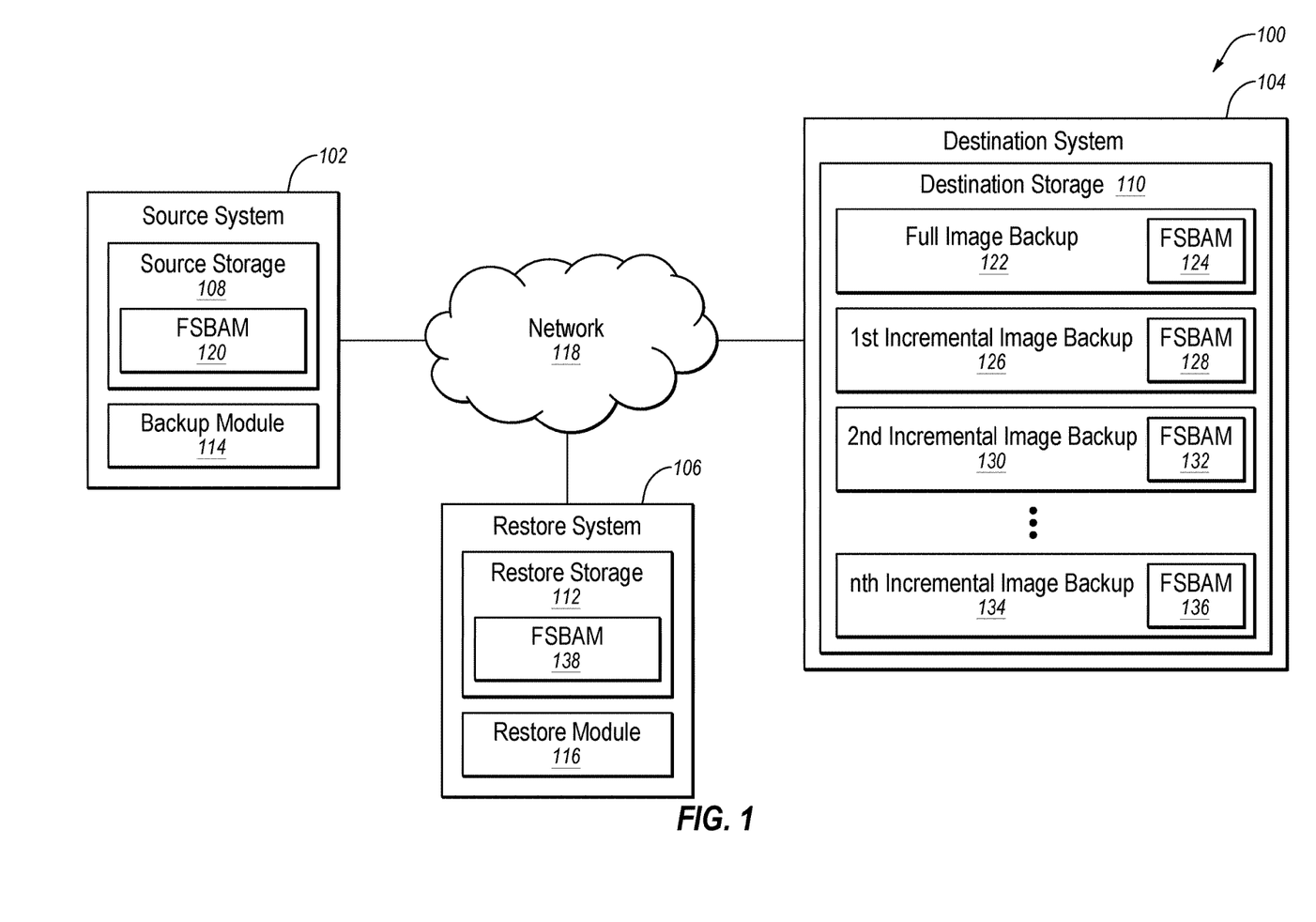
FIG. 1 is a schematic block diagram illustrating an example image backup and restore system.

FIG. 1 is a schematic block diagram illustrating an example image backup and restore system 100. As disclosed in FIG. 1, the system 100 may include a source system 102, a destination system 104, and a restore system 106. The systems 102, 104, and 106 may include storages 108, 110, and 112, respectively. The source system 102 may also include a backup module 114 and the restore system 106 may also include a restore module 116. The systems 102, 104, and 106 may be configured to communicate with one another over a network 118.

The destination storage 110 may store one or more image backups of the source storage 108, including file system block allocation maps (FSBAMs) of the source storage 108. For example, the destination storage 110 may store a full image backup 122 including an FSBAM 124, a 1st incremental image backup 126 including an FSBAM 128, a 2nd incremental image backup 130 including an FSBAM 132, and an nth incremental image backup 134 including an FSBAM 136. Each image backup may depend on other image backups to represent the state of the source storage 108, and to represent the content of the corresponding FSBAM. The full image backup 122 may represent the state of the source storage at time t(1), the 1st incremental image backup 126 combined with prior image backups may represent the state of the source storage at time t(2), the 2nd incremental image backup 130 combined with prior image backups may represent the state of the source storage at time t(3), and the nth incremental image backup 134 combined with prior image backups may represent the state of the source storage at time t(n+1). Upon restoration of any of the image backups, the restore storage 112 will be restored with an FSBAM 138.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 118 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 118 may also be a network emulation of a hypervisor over which one or more virtual machines and/or physical machines may communicate.

The incremental image backup chain stored in the destination storage 110 may be created by the backup module 114. For example, the backup module 114 may be one or more programs that are configured, when executed, to cause one or more processors to perform image backup operations of creating a full image backup and multiple incremental image backups of the source storage 108. It is noted that these image backups may initially be created on the source system 102 and then copied to the destination system 104.

For example, the full image backup 122 may be created to capture the state of the source storage 108 at time t(1). This image backup operation may include the backup module 114 copying all unique allocated blocks of the source storage 108 as allocated at time t(1), including one or more unique allocated blocks that include the FSBAM 124, and storing the unique allocated blocks in the destination storage 110, or verifying that the unique allocated blocks are already stored in the destination storage 110. The state of the source storage 108 at time t(1) may be captured using snapshot technology in order to capture the blocks stored in the source storage 108 at time t(1) without interrupting other processes, thus avoiding downtime of the source storage 108. The full image backup 122 may be relatively large depending on the size of the source storage 108 and the number of allocated blocks at time t(1). As a result, the full image backup 122 may take a relatively long time to create and consume a relatively large amount of space in the destination storage 110.

Next, the 1st and 2nd incremental image backups 126 and 130 may be created to capture the states of the source storage 108 at times t(2) and t(3), respectively. This may include copying only modified unique allocated blocks of the source storage 108 present at time t(2), including one or more modified unique allocated blocks that include the FSBAM 128, and storing the modified unique allocated blocks in the destination storage 110, or verifying that the modified unique allocated blocks are already stored in the destination storage 110, then later copying only modified unique allocated blocks of the source storage 108 present at time t(3), including one or more modified unique allocated blocks that include the FSBAM 132, and storing the modified unique allocated blocks in the destination storage 110, or verifying that the modified unique allocated blocks are already stored in the destination storage 110. The states of the source storage 108 at times t(2) and t(3) may also be captured using snapshot technology, thus avoiding downtime of the source storage 108. Each incremental image backup may include only those unique allocated blocks from the source storage 108 that were modified after the time of the previous image backup. Thus, the 1st incremental image backup 126 may include only those unique allocated blocks from the source storage 108 that were modified between time t(1) and time t(2), and the 2nd incremental image backup 130 may include only those unique allocated blocks from the source storage 108 that were modified between time t(2) and time t(3). In general, as compared to the full image backup 122, each incremental image backup may take a relatively short time to create and consume a relatively small storage space in the destination storage 110.

Finally, the nth incremental image backup 134 may be created to capture the state of the source storage 108 at time t(n+1). This may include copying only modified unique allocated blocks of the source storage 108 present at time t(n+1), including one or more modified unique allocated blocks that include the FSBAM 136, using snapshot technology, and storing the modified unique allocated blocks in the destination storage 110, or verifying that the modified unique allocated blocks are already stored in the destination storage 110. The nth incremental image backup 134 may include only those unique allocated blocks from the source storage 108 that were modified between time t(n) and time t(n+1).

Therefore, incremental image backups may be created on an ongoing basis. The frequency of creating new incremental image backups may be altered as desired in order to adjust the amount of data that will be lost should the source storage 108 experience corruption of its stored blocks or become unavailable at any given point in time. The blocks from the source storage 108 can be restored to the state at the point in time of a particular incremental image backup by applying the image backups to the restore storage 112 from oldest to newest, namely, first applying the full image backup 122 and then applying each successive incremental image backup up to the particular incremental image backup. Alternatively, the blocks from the source storage 108 can be restored to the state at the point in time of a particular incremental image backup by applying the image backups to the restore storage 112 concurrently, namely, concurrently applying the full image backup 122 and each successive incremental image backup up to the particular incremental image backup.

Although only allocated blocks are included in the example incremental image backups discussed above, it is understood that in alternative implementations both allocated and free blocks may be backed up during the creation of a full image backup or an incremental image backup. This is typically done for forensic purposes, because the contents of free blocks can be interesting where the free blocks contain data from a previous point in time when the blocks were in use and allocated. Therefore, the creation of full image backups and incremental image backups as disclosed herein is not limited to allocated blocks but may also include free blocks.

Further, although only full image backups and incremental image backups are discussed above, it is understood that the source storage 108 may instead be backed up by creating a full image backup and one or more decremental image backups. Decremental image backups are created by initially creating a full image backup to capture the state at an initial point in time, then updating the full image backup to capture the state at a subsequent point in time by modifying only those blocks in the full image backup that were modified between the initial and subsequent points in time. Prior to the updating of the full image backup, however, any original blocks in the full image backup that correspond to the locations of the modified blocks are copied to a decremental image backup, thus enabling restoration of the source storage 108 at the initial point in time (by restoring the updated full image backup and then restoring the decremental image backup, or by concurrently restoring the updated full image backup and the decremental image backup) or at the subsequent point in time (by simply restoring the updated full image backup). Since restoring a single full image backup is generally faster than restoring a full image backup and one or more incremental or decremental image backups, creating decremental image backups instead of incremental image backups may enable the most recent image backup to be restored more quickly since the most recent image backup is always a full image backup instead of potentially being an incremental image backup. Therefore, the methods disclosed herein are not limited to implementation on incremental image backup chains, but may also include implementation on decremental image backup chains.

In one example embodiment, the destination system 104 may be a network server, the source system 102 may be a first desktop computer, the source storage 108 may be a volume on one or more magnetic hard drives of the first desktop computer, the restore system 106 may be a second desktop computer, the restore storage 112 may be a volume on one or more magnetic hard drives of the second desktop computer, and the network 118 may include the internet. In this example embodiment, the first desktop computer may be configured to periodically back up the volume of the first desktop computer to the network server over the internet as part of a backup job by creating the full image backup 122 and the multiple incremental image backups 126, 130, and 134 stored in the destination storage 110. The first desktop computer may also be configured to track incremental changes to its volume between backups in order to easily and quickly identify only those blocks that were modified for use in the creation of an incremental backup. The second desktop computer may also be configured to restore one or more of the image backups from the network server over the internet to the volume of the second desktop computer if the first desktop computer experiences corruption of its volume or if the first desktop computer's volume becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 118, it is understood that the systems 102, 104, and 106 may instead communicate directly with each other. For example, in some embodiments any combination of the systems 102, 104, and 106 may be combined into a single system, including embodiments where the source storage 108 represents the same storage as the restore storage 112. Further, although the backup module 114 and the restore module 116 are the only modules disclosed in the system 100 of FIG. 1, it is understood that the functionality of the modules 114 and 116 may be replaced or augmented by one or more similar modules residing on any of the systems 102, 104, or 106 or another system. Finally, although only a single source storage and a single restore storage are disclosed in the system 100 of FIG. 1, it is understood that the destination system 104 of FIG. 1 may be configured to simultaneously back up multiple source storages and/or to simultaneously restore to multiple restore storages. For example, where the destination system 104 is configured as a deduplication system (that is capable of removing duplicate blocks within image backups and/or is capable of removing duplicate blocks between image backups), the greater the number of storages that are backed up to the destination storage 110 of the destination system 104, the greater the likelihood for reducing redundancy and for reducing the overall number of blocks being backed up, resulting in corresponding decreases in the overall size requirements of the destination storage 110 and in the bandwidth overhead of transporting blocks to the destination storage 110.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2A:
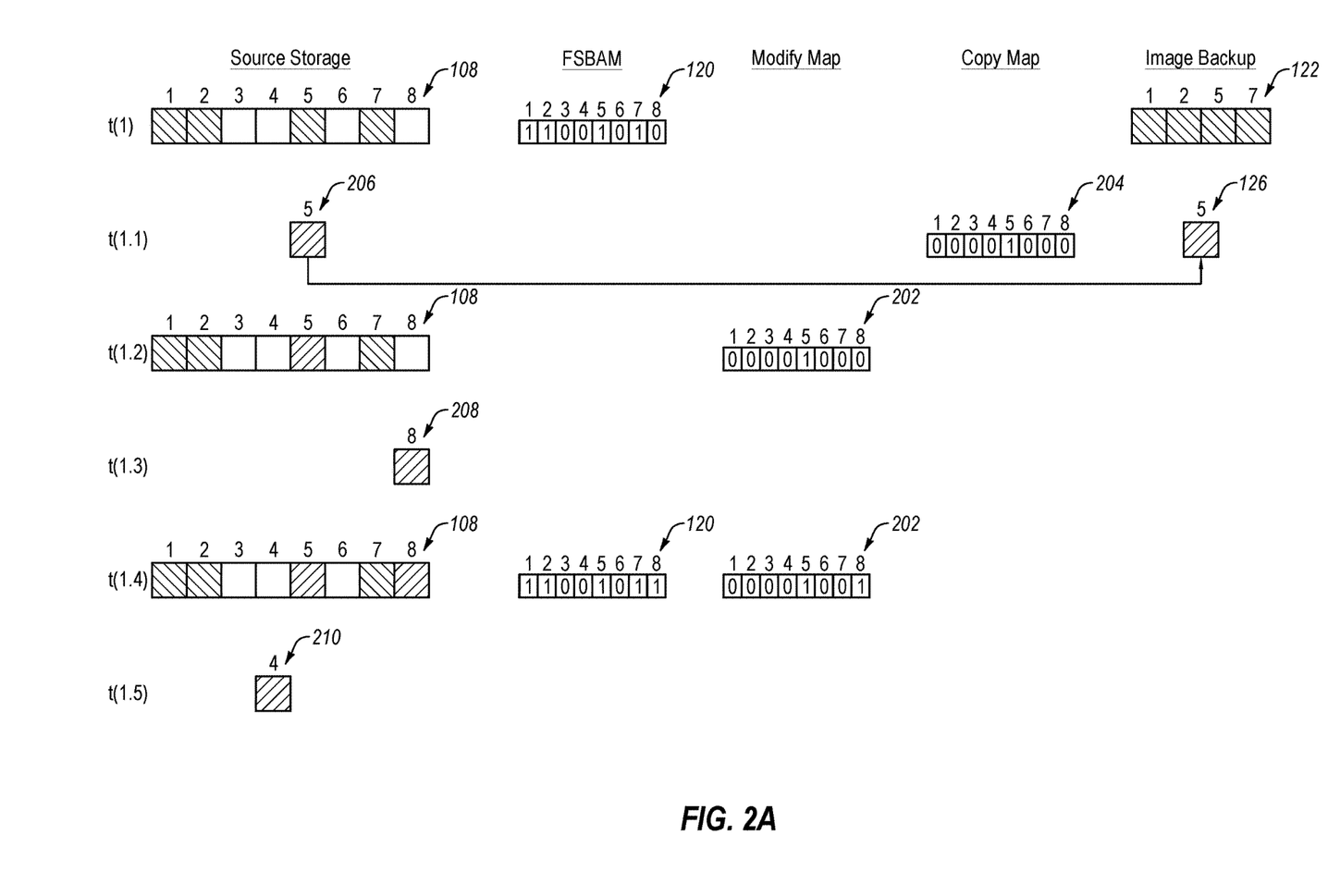
FIGS. 2A and 2B are a schematic block diagram illustrating a head start population of an image backup.
Figure 2B:
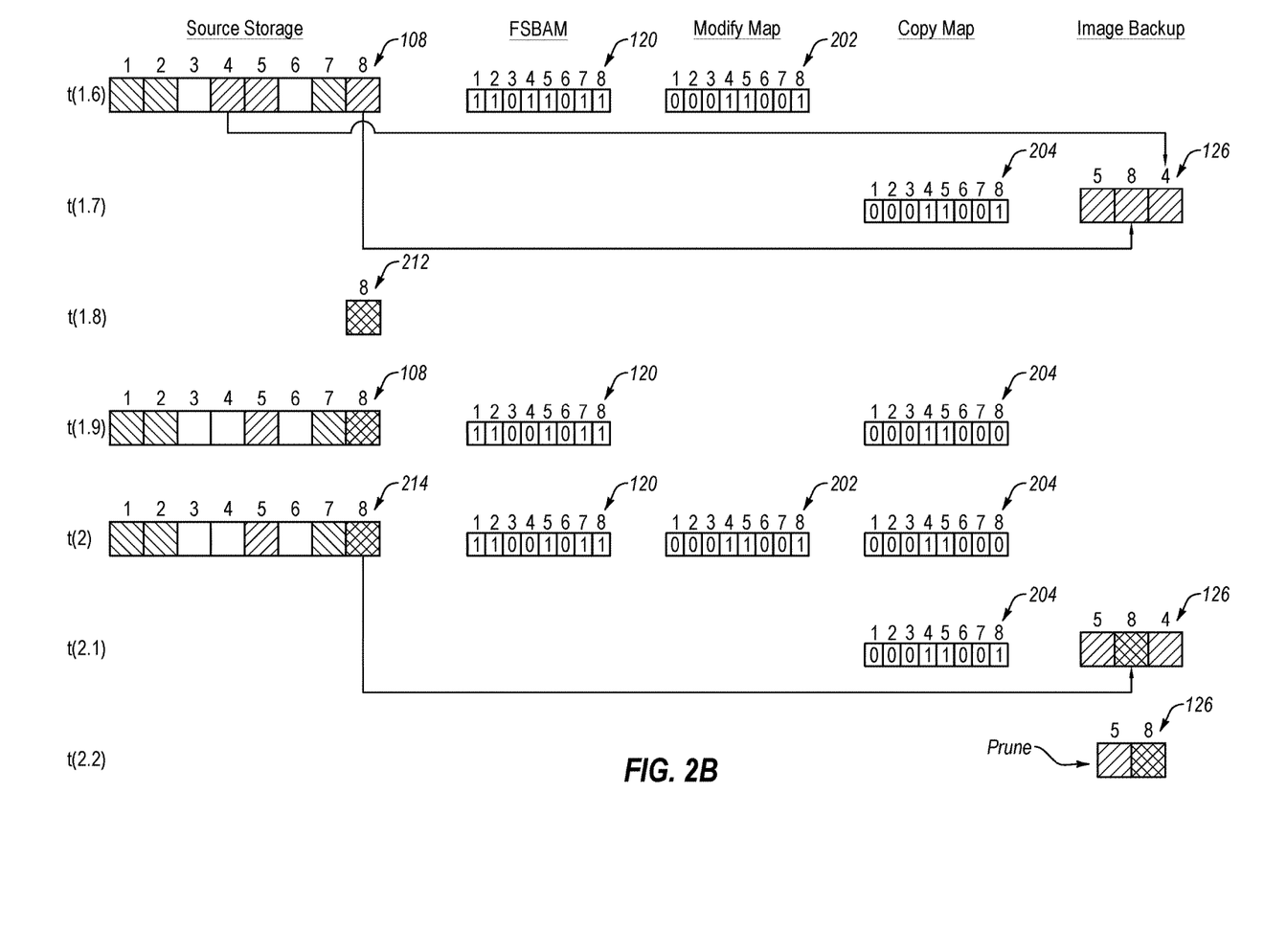

FIGS. 2A and 2B are a schematic block diagram illustrating a head start population of an image backup. In particular, FIGS. 2A and 2B disclose the states of the source storage 108 at times t(1), t(1.1), t(1.2), t(1.3), t(1.4), t(1.5), t(1.6), t(1.7), t(1.8), t(1.9), and t(2). As noted previously, the full image backup 122 represents the state of the source storage 108 at time t(1) and the 1st incremental image backup 126, once fully populated, represents the state of the source storage at time t(2). As disclosed in FIGS. 2A and 2B, allocated blocks in the source storage 108, the full image backup 122, and the 1st incremental image backup 126 are illustrated with a hatch pattern and free blocks are illustrated as blank. Further, blocks in the FSBAM 120, a modify map 202, and a copy map 204 are represented with a '1' bit for allocated/modified/copied blocks and with a '0' bit for free/original/uncopied bocks. The modify map 202 may be employed to track some or all blocks that are modified in the source storage 108 between two points in time, such as time t(1) and time t(2). The copy map may be employed to track all of the modified blocks that are copied into an image backup between two points in time, such as all of the modified blocks that are copied into the 1st incremental image backup 126 between time t(1) and time t(2). It is understood that while the FSBAM 120, the modify map 202, and the copy map 204 are illustrated as bitmaps, these maps may alternatively be implemented as any other data structure that enable the tracking of allocated/modified/copied blocks.

As disclosed in FIG. 2, the state of the source storage 108 at time t(1) includes allocated blocks in positions (1), (2), (5), and (7) and free blocks at positions (3), (4), (6), and (8), as illustrated in both the source storage 108 and the FSBAM 120 at time t(1). During the creation of the full image backup 122, the allocated blocks in positions (1), (2), (5), and (7) may be copied to the full image backup 122 using snapshot technology in order to capture the blocks stored in the source storage 108 at time t(1) without interrupting other processes, thus avoiding downtime of the source storage 108.

As disclosed in FIG. 2, the state of the source storage 108 at various points in time changes based on writes to the source storage 108. For example, at time t(1.1), a write request 206 to position (5) of the source storage 108 may be intercepted. Then, while the block to be written is still in memory, and due to a determination that a resource associated with the source storage 108 is below a threshold defined in a resource utilization policy associated with the source storage 108, the block may be copied to the 1st incremental image backup 126, as represented by the arrow at time t(1.1), resulting in an update to the copy map 204 to add a '1' bit to position (5). This copying may be accomplished, for example, where the file format of the 1st incremental image backup 126 is randomly writable, which may allow a block from any position in the source storage 108 to be inserted out of order into the 1st incremental image backup 126. Then, at time t(1.2), the block may be written over the previous block at position (5) of the source storage 108, resulting in an update to the modify map 202 to add a '1' bit to position (5).

Next, at time t(1.3), a write request 208 to position (8) of the source storage 108 may be intercepted. Then, due to a determination that the resource associated with the source storage 108 is not below the threshold defined in a resource utilization policy, at time t(1.4), the block may be written over the previous block at position (8) of the source storage 108, resulting in an update to the FSBAM 120 to add a '1' bit to position (8) and an update to the modify map 202 to add a '1' bit to position (8), without yet copying the block to the 1st incremental image backup 126.

Next, at time t(1.5), a write request 210 to position (4) of the source storage 108 may be intercepted. Then, while the block to be written is still in memory, and due to a determination that the resource associated with the source storage 108 is not below the threshold defined in a resource utilization policy, at time t(1.6), the block may be written at previously-free position (4) of the source storage 108, resulting in an update to the FSBAM 120 to add a '1' bit to position (4) and an update to the modify map 202 to add a '1' bit to position (4), without yet copying the block to the 1st incremental image backup 126.

Then, at time t(1.7), and due to a determination that the resource associated with the source storage 108 is below the threshold defined in a resource utilization policy, the modified blocks in positions (8) and (4) of the source storage 108 may be copied to the 1st incremental image backup 126, as represented by the arrows at time t(1.7), resulting in corresponding updates to the copy map 204 to add a '1' bit to positions (8) and (4).

Next, at time t(1.8), a second write request 212 to position (8) of the source storage 108 may be intercepted. Then, due to a determination that the resource associated with the source storage 108 is not below the threshold defined in a resource utilization policy, at time t(1.9), the block may be written over the previous modified block at position (8) of the source storage 108, without yet copying the block to the 1st incremental image backup 126. In order to track the fact that the block at position (8) of the 1st incremental image backup 126 is no longer the most recently modified block for position (8) of the source storage 108, this writing of the block at position (8) of the source storage 108 may result in an update to the copy map 204 to change the '1' bit in position (8) to a '0' bit, which indicates that the most recently modified block at position (8) of the source storage 108 has not yet been copied to the 1st incremental image backup 126.

Another change at time t(1.9) to the source storage 108 is a command that frees the block at position (4) of the source storage 108, resulting in a free block at position (4) of the source storage and an update to the FSBAM 120 to change the '1' bit in position (4) to a '0' bit. The freeing of the block at position (4) of the source storage 108 may result, for example, from the deletion of the block at position (4).

At time t(2), a snapshot 214 may be activated on the source storage 108, which may enable the state of the source storage 108 to be captured without interrupting other processes, thus avoiding downtime of the source storage 108. It is noted that the blocks in the snapshot 214 may actually be stored in the source storage 108, in a separate copy of one or more blocks of the source storage 108, or some combination thereof, using a copy-on-write snapshot process. The snapshot 214 may therefore include many or all of the actual blocks of the source storage 108. Then, subsequent to time t(2) it may be determined, by examining the FSBAM 120, the modify map 202, and the copy map 204 for example, that the block at position (8) of the snapshot 214 is the only modified block that has not yet been copied to the 1st incremental image backup 126. Consequently, at time t(2.1) the block at position (8) of the snapshot 214 may then be copied to the 1st incremental image backup 126, resulting in an update to the copy map 204 to add a '1' bit to position (8).

Finally, at time t(2.2), the 1st incremental image backup 126 may be pruned to remove the block at position (4) because the block at position (4) is free in the source storage 108 at time t(2), as indicated in the FSBAM 120 at time t(2) in FIG. 2B.

As disclosed in FIGS. 2A and 2B, the population of the 1st incremental image backup 126 is at least partially performed prior to time t(2), which results in a "head start" on the population in comparison to methods where the population begins at time t(2). This head start population of the 1st incremental image backup 126 prior to time t(2) leaves fewer modified blocks from the source storage 108 to be copied to the 1st incremental image backup 126 after time t(2). Where this head start population is performed during periods of relatively low resource utilization prior to time t(2), this head start population may lessen the overall drain on system resources during the population of the 1st incremental image backup 126. Further, since this head start population of a portion of the blocks prior to time t(2) leaves fewer blocks to be copied subsequent to time t(2), the length of time between time t(2) and the completion of the population of the 1st incremental image backup 126 may be reduced, thereby increasing the likelihood that the 1st incremental image backup 126 will be available for a restoration prior to the need for the restoration.

Figure 3:
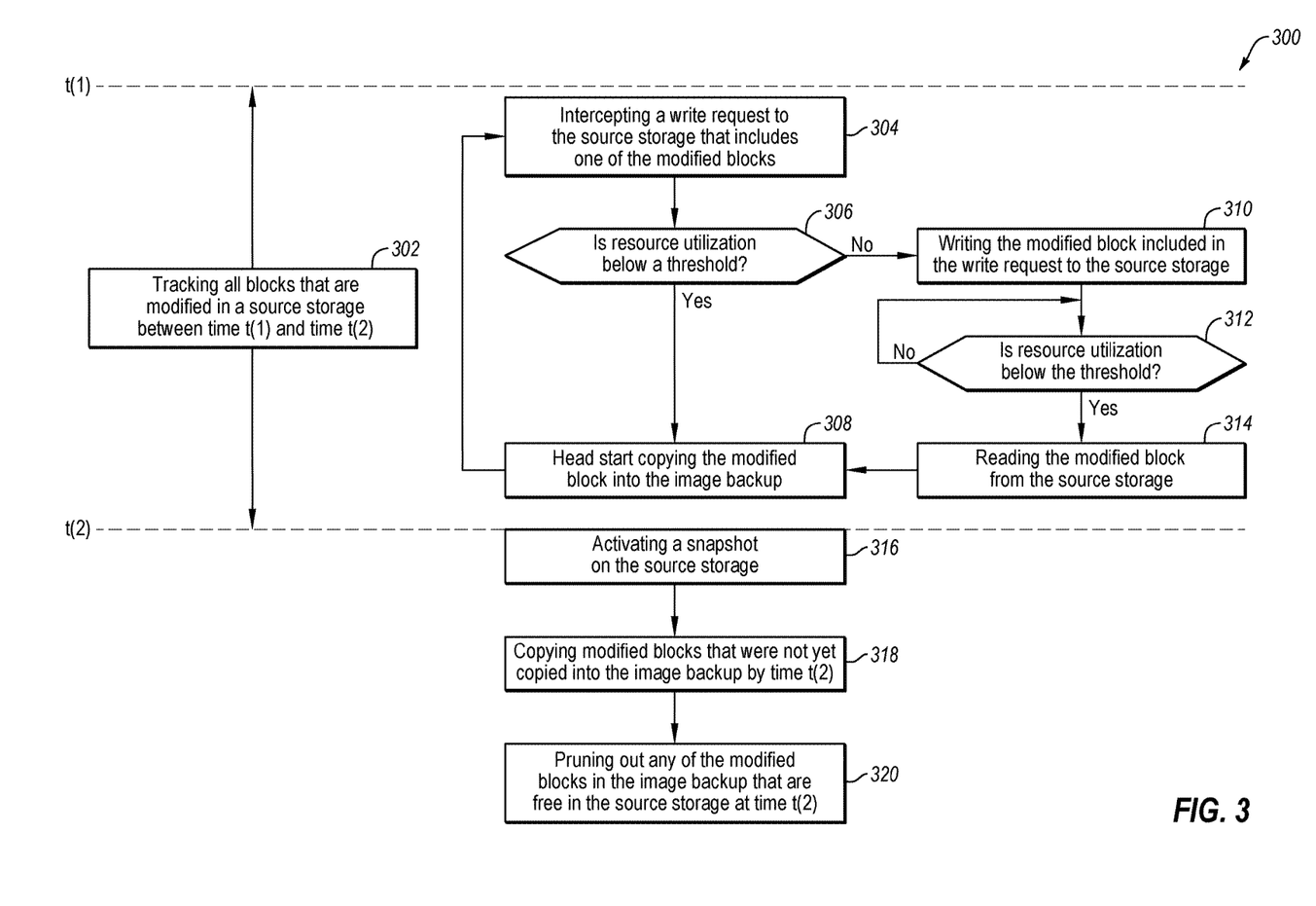
FIG. 3 is a schematic flowchart illustrating an example method for head start population of an image backup.

FIG. 3 is a schematic flowchart illustrating an example method 300 for head start population of an image backup. The method 300 may be implemented, in at least some embodiments, by the backup module 114 of FIG. 1. For example, the backup module 114 may be one or more programs, stored on one or more non-transitory computer-readable media, that are configured, when executed, to cause one or more processors to perform operations of head start population of an image backup, as represented by one or more of steps 302-320 of the method 300. Although illustrated as discrete steps, various steps may be divided into additional steps, combined into fewer steps, reordered, or eliminated, depending on the desired implementation. Also, prior to the method 300, various image backups, such as full, incremental, or decremental image backups, may have been created of the source storage 108 and then stored in the destination storage 110. The method 300 will now be discussed with reference to FIGS. 1-3.

The method 300 may include step 302 of tracking blocks that are modified in a source storage between time t(1) and time t(2). For example, the backup module 114 of FIG. 1 may track, at step 302, some or all blocks that are modified in the source storage 108 between time t(1) and time t(2). As disclosed in FIG. 3, this tracking may span the entire time period between time t(1) and time t(2). As disclosed in FIGS. 2A and 2B, this tracking may be accomplished using the modify map 202.

The method 300 may include step 304 of intercepting a write request to the source storage that includes one of the modified blocks. Continuing with the above example, the backup module 114 of FIG. 1 may intercept, at step 304, the write request 206 at time t(1.1) or the write request 210 at time t(1.5) to the source storage 108, as disclosed in FIG. 2A. As discussed in connection with FIG. 2A, the write request 206 includes a modified block for position (5) of the source storage 108, and the write request 210 includes a modified block for position (4) of the source storage.

The method 300 may include decision step 306 of determining whether resource utilization is below a threshold. Continuing with the above example, the backup module 114 of FIG. 1 may determine, at step 306, whether utilization of a resource associated with the source storage 108 is below a threshold defined in a resource utilization policy. For example, the resource may be a disk, a central processing unit (CPU), a memory, a bus, or a network, or some combination thereof, associated with the source storage 108. In the example where the resource is a disk, the resource utilization policy may specify a threshold disk utilization level below which head start population is appropriate.

If it is determined at step 306 that the utilization of the resource associated with the source storage is below the threshold defined in the resource utilization policy (YES at step 306), then the method 300 may include step 308 of head start copying the modified block included in the write request into the backup image. Continuing with the above example, the backup module 114 of FIG. 1 may determine, at step 306, that the utilization of the disk associated with the source storage 108 is below the threshold disk utilization level defined in a resource utilization policy at time t(1.1), and then head start copy, at step 308, the modified block included in the write request 206 into the 1st incremental image backup 126, as disclosed by the arrow at time t(1.1) in FIG. 2A. This head start copying may occur while the block to be written is still in memory and without first having to write and then read the modified block from the source storage 108.

If it is determined at step 306 that the utilization of the resource associated with the source storage is not below the threshold defined in the resource utilization policy (NO at step 306), then the method 300 may include step 310 of writing the modified block included in the write request to the source storage. Continuing with the above example, the backup module 114 of FIG. 1 may determine, at step 306, that the utilization of the disk associated with the source storage 108 is not below the threshold disk utilization level defined in a resource utilization policy at time t(1.5), and then write the modified block included in the write request 210 to position (4) of the source storage 108 at time t(1.6), as disclosed in FIG. 2B.

The method 300 may include decision step 312 of determining whether the resource utilization below the threshold. Continuing with the above example, the backup module 114 of FIG. 1 may determine, at step 312, whether utilization of the disk associated with the source storage 108 is below the threshold disk utilization level defined in a resource utilization policy.

If it is determined at step 312 that the utilization of the resource associated with the source storage is not below the threshold defined in the resource utilization policy (NO at step 312), then the method 300 may repeat step 312 until the resource associated with the source storage is below the threshold defined in the resource utilization policy. Continuing with the above example, the backup module 114 of FIG. 1 may determine, at step 312, that the utilization of the disk associated with the source storage 108 is not below the threshold disk utilization level defined in a resource utilization policy at time t(1.5), and may repeat step 312 until the utilization of the disk associated with the source storage 108 is below the threshold defined in the resource utilization policy.

If it is determined at step 312 that the utilization of the resource associated with the source storage is below the threshold defined in the resource utilization policy (YES at step 312), then the method 300 may include step 314 of reading the modified block from the source storage 108. Continuing with the above example, the backup module 114 of FIG. 1 may determine, at step 312, that the utilization of the disk associated with the source storage 108 is below the threshold disk utilization level defined in a resource utilization policy at time t(1.7), and then read the modified block from position (4) of the source storage 108. The backup module 114 of FIG. 1 may then proceed to head start copy, at step 308, the modified block that was read from position (4) of the source storage 108 into the 1st incremental image backup 126, as disclosed by the arrow at time t(1.7) in FIG. 2B.

As disclosed in FIG. 3, step 304 and subsequent steps may be repeated until time t(2) for each intercepted write request that occurs between time t(1) and time t(2).

Continuing with the above example, at the conclusion of step 308, the modified blocks from the write request 206 and 210 will have been head start copied into the 1st incremental image backup 126, resulting in the head start population of the 1st incremental image backup 126 prior to time t(2). This head start population of the 1st incremental image backup 126 prior to time t(2) leaves fewer modified blocks from the source storage 108 to be copied to the 1st incremental image backup 126 after time t(2). Where this head start population is performed during periods of relatively low resource utilization prior to time t(2), head start population may lessen the overall drain on system resources during the population of the 1st incremental image backup 126. Further, since this head start population of a portion of the blocks prior to time t(2) leaves fewer blocks to be copied subsequent to time t(2), the length of time between time t(2) and the completion of the population of the 1st incremental image backup 126 may be reduced, thereby increasing the likelihood that the 1st incremental image backup 126 will be available for a restoration prior to the need for the restoration.

The method 300 may include step 316 of activating a snapshot on the source storage. Continuing with the above example, the backup module 114 of FIG. 1 may activate, at step 316, a snapshot 214 on the source storage 108 at time t(2), as disclosed in FIG. 2B. As disclosed above in connection with FIG. 2B, the snapshot 214 may represent the state of the source storage 108 at time t(2).

The method 300 may include step 318 of copying modified blocks that were not yet copied into the backup image by time t(2). Continuing with the above example, the backup module 114 of FIG. 1 may copy, at step 318, the modified block at position (8) of the snapshot 214 into the 1st incremental image backup 126 because the modified block at position (8) was not yet copied into the source storage by time t(2), as disclosed by the arrow at time t(2.1) of FIG. 2B. The determination that the block at position (8) was not yet copied may be made by examining the copy map 204 at time t(2) in FIG. 2B.

The method 300 may include step 320 of pruning out any of the modified blocks in the backup image that are free in the source storage at time t(2). Continuing with the above example, the backup module 114 of FIG. 1 may prune out, at step 320, the modified block in position (4) of the 1st incremental image backup 126 because the modified block in position (4) is free in the source storage 108 (and in the snapshot 214 of the source storage 108) at time t(2), as disclosed in prune label and arrow at time t(2.2) in FIG. 2B. The identification of the block at position (4) as being free in the source storage 108 at time t(2) may be made by accessing the FSBAM 120 at time t(2) in FIG. 2B.

It is understood that the foregoing discussion of the method 300 is but one possible implementation of a method for head start population of an image backup, and various modifications are possible and contemplated. For example, the method 300 may be modified to remove step 320. Additionally or alternatively, steps 306-314 may be replaced with other implementations of head start copying a first portion of the modified blocks into the image backup. Additionally or alternatively, step 316 may be modified to preserve the state of the source storage at the second point in time using a process other than a snapshot process. Additionally or alternatively, the tracking of modifications to the source storage and the tracking of head start copying to the image backup in the method 300 may be accomplished without employing both the modify map 202 and the copy map 204. For example, the modify map 202 may be employed alone where the position of each modified block is only set with a '1' bit until the modified block has been copied to the image backup, at which point the position may be reset with a '0' bit. In other words, the head start copying of modified blocks into the image backup may result in the removal of the tracking of the modified blocks in the modify map 202.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for head start population of an image backup, the method comprising:
    tracking blocks that are modified in a source storage between a first point in time and a second point in time;
    prior to the second point in time, head start copying a first portion of the modified blocks into the image backup, according to a resource utilization policy of a resource associated with the source storage, and ceasing the tracking of the first portion of the modified blocks, wherein the head start copying includes:
        intercepting a write request to the source storage that includes one of the modified blocks;
        determining that utilization of the resource associated with the source storage is below a threshold defined in the resource utilization policy; and
        head start copying the modified block included in the write request into the image backup without reading the modified block from the source storage;
    activating a snapshot on the source storage at the second point in time, the snapshot representing a state of the source storage at the second point in time; and
    subsequent to the second point in time, copying, from the snapshot and into the image backup, a second portion of the modified blocks that were not yet copied into the image backup by the second point in time.

2. The method as recited in claim 1, wherein a file format of the image backup is randomly writable.

3. The method as recited in claim 1, wherein the resource is a disk, a central processing unit (CPU), a memory, a bus, or a network, or some combination thereof, associated with the source storage.

4. The method as recited in claim 1, further comprising:
pruning out any of the modified blocks in the image backup that are free in the source storage at the second point in time.

5. One or more non-transitory computer-readable media storing one or more programs that are configured, when executed, to cause one or more processors to perform a method for head start population of an image backup, the method comprising:
tracking blocks that are modified in a source storage between a first point in time and a second point in time;
prior to the second point in time, head start copying a first portion of the modified blocks into the image backup, according to a resource utilization policy of a resource associated with the source storage, and ceasing the tracking of the first portion of the modified blocks, wherein the head start copying includes:
intercepting a write request to the source storage that includes one of the modified blocks;
determining that utilization of the resource associated with the source storage is below a threshold defined in the resource utilization policy; and
head start copying the modified block included in the write request into the image backup without reading the modified block from the source storage;
activating a snapshot on the source storage at the second point in time, the snapshot representing a state of the source storage at the second point in time; and
subsequent to the second point in time, copying, from the snapshot and into the image backup, a second portion of the modified blocks that were not yet copied into the image backup by the second point in time.

6. A method for head start population of an image backup, the method comprising:
tracking, in a modify map, blocks that are modified in a source storage between a first point in time and a second point in time;
prior to the second point in time, head start copying a first portion of the modified blocks into an image backup and removing the tracking of the first portion of the modified blocks in the modify map;
activating a snapshot on the source storage at the second point in time, the snapshot representing a state of the source storage at the second point in time; and
subsequent to the second point in time, copying, from the snapshot and into the image backup, a second portion of the modified blocks that were tracked in the modify map at the second point in time.

7. The method as recited in claim 6, wherein:
the head start copying of the first portion of the modified blocks into the image backup is performed during one or more time periods in which utilization of a resource associated with the source storage is below a threshold defined in a resource utilization policy; and
the resource is a disk, a central processing unit (CPU), a memory, a bus, or a network, or some combination thereof, associated with the source storage.

8. The method as recited in claim 6, wherein the head start copying of the first portion of the modified blocks into the image backup includes:
intercepting a write request to the source storage that includes one of the modified blocks; and
head start copying the modified block included in the write request into the image backup without reading the modified block from the source storage.

9. The method as recited in claim 6, wherein the head start copying of the first portion of the modified blocks into the image backup includes:
reading one of the modified blocks from the source storage; and
head start copying the modified block into the image backup.

10. The method as recited in claim 6, further comprising:
identifying, by accessing a file system block allocation map (FSBAM) of the snapshot, any of the modified blocks that are free in the source storage at the second point in time; and
pruning out of the image backup the modified blocks that are free in the source storage at the second point in time.

11. One or more non-transitory computer-readable media storing one or more programs that are configured, when executed, to cause one or more processors to perform a method for head start population of an image backup, the method comprising:
tracking, in a modify map, blocks that are modified in a source storage between a first point in time and a second point in time;
prior to the second point in time, head start copying a first portion of the modified blocks into an image backup and removing the tracking of the first portion of the modified blocks in the modify map;
activating a snapshot on the source storage at the second point in time, the snapshot representing a state of the source storage at the second point in time; and
subsequent to the second point in time, copying, from the snapshot and into the image backup, a second portion of the modified blocks that were tracked in the modify map at the second point in time.

12. A method for head start population of an image backup, the method comprising:
tracking, in a modify map, blocks that are modified in a source storage between a first point in time and a second point in time;
tracking, in a copy map, all of the modified blocks that are copied into an image backup between the first point in time and the second point in time;
prior to the second point in time, head start copying a first portion of the modified blocks into the image backup and removing the tracking of the first portion of the modified blocks in the copy map;
activating a snapshot on the source storage at the second point in time, the snapshot representing a state of the source storage at the second point in time; and
subsequent to the second point in time, copying, from the snapshot and into the image backup, a second portion of the modified blocks that were tracked in the modify map at the second point in time but were not yet tracked in the copy map by the second point in time.

13. The method as recited in claim 12, wherein:
the head start copying of the first portion of the modified blocks into the image backup is performed during one or more time periods in which utilization of a resource associated with the source storage is below a threshold defined in a resource utilization policy; and
the resource is a disk, a central processing unit (CPU), a memory, a bus, or a network, or some combination thereof, associated with the source storage.

14. The method as recited in claim 12, wherein the head start copying of the first portion of the modified blocks into the image backup includes:

intercepting a write request to the source storage that includes one of the modified blocks; and copying the modified block included in the write request into the image backup without reading the block from the source storage.

15. The method as recited in claim 12, wherein the head start copying of the first portion of the modified blocks into the image backup includes:

reading one of the modified blocks from the source storage; and copying the modified block into the image backup.

16. The method as recited in claim 12, further comprising:

identifying, by accessing a file system block allocation map (FSBAM) of the snapshot, any of the modified blocks that are free in the source storage at the second point in time; and pruning out of the image backup the modified blocks that are free in the source storage at the second point in time.

17. One or more non-transitory computer-readable media storing one or more programs that are configured, when executed, to cause one or more processors to perform a method for head start population of an image backup, the method comprising:

tracking, in a modify map, blocks that are modified in a source storage between a first point in time and a second point in time;

tracking, in a copy map, all of the modified blocks that are copied into an image backup between the first point in time and the second point in time;

prior to the second point in time, head start copying a first portion of the modified blocks into the image backup and removing the tracking of the first portion of the modified blocks in the copy map;

activating a snapshot on the source storage at the second point in time, the snapshot representing a state of the source storage at the second point in time; and subsequent to the second point in time, copying, from the snapshot and into the image backup, a second portion of the modified blocks that were tracked in the modify map at the second point in time but were not yet tracked in the copy map by the second point in time.

* * * * *